United States Patent
Yokooji

(10) Patent No.: US 9,885,787 B2
(45) Date of Patent: Feb. 6, 2018

(54) ELECTRONIC SATELLITE FEED SWITCHER

(71) Applicant: EchoStar Technologies L.L.C., Englewood, CO (US)

(72) Inventor: Elden Yokooji, Golden, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 820 days.

(21) Appl. No.: 14/444,093

(22) Filed: Jul. 28, 2014

(65) Prior Publication Data

US 2016/0025858 A1    Jan. 28, 2016

(51) Int. Cl.
*H04H 20/74* (2008.01)
*G01S 19/13* (2010.01)
*H04H 20/12* (2008.01)
*H01H 47/00* (2006.01)

(52) U.S. Cl.
CPC .............. *G01S 19/13* (2013.01); *H04H 20/12* (2013.01); *H04H 20/74* (2013.01); *H01H 47/001* (2013.01)

(58) Field of Classification Search
CPC .............................. H04H 20/74; H04H 20/10
USPC ..... 455/134, 277.2, 78, 427, 428, 430, 3.02, 455/13.1, 12.1
See application file for complete search history.

(56) References Cited

U.S. PATENT DOCUMENTS

| | | | |
|---|---|---|---|
| 5,805,974 A * | 9/1998 | Hite | H04H 20/18 348/E7.063 |
| 2005/0272384 A1* | 12/2005 | Kogure | H04B 7/0811 455/134 |
| 2007/0004345 A1* | 1/2007 | Ono | H04B 7/0805 455/78 |

* cited by examiner

*Primary Examiner* — John J Lee
(74) *Attorney, Agent, or Firm* — Bejin Bieneman PLC

(57) ABSTRACT

A feed switcher for a satellite telecommunication system includes a microcontroller, a first relay, and a second relay. The first relay receives as inputs a first satellite feed and a second satellite feed. The second relay receives as inputs a third satellite feed and an output of the first relay. The output of the first relay includes the first satellite feed or the second satellite feed. The microcontroller has a first port and a second port, and the output of the second relay is based on whether at least one of the first port and the second port is open. Therefore, the output of the second relay may be either the output of the first relay or the third satellite feed.

18 Claims, 2 Drawing Sheets

ELECTRONIC SATELLITE FEED SWITCHER

BACKGROUND

Satellite telecommunication uses different satellite feeds for different orbital locations. For instance, different feeds can include a Western Arc feed and an Eastern Arc feed. These individual feeds must be separately connected to a satellite receiver for testing purposes, limiting options for remote testing. Because a satellite receiver can only accept one feed at a time, a technician must be near the satellite receiver to physically switch the feeds during the test. Therefore, while some parts of the test may be completed remotely, a technician must be physically present to switch the feeds.

DETAILED DESCRIPTION

Electronically controlling which feeds are provided to a satellite receiver may allow for remote testing without requiring a technician be physically present. An example system includes a feed switcher having a microcontroller, a first relay, and a second relay. The microcontroller has a first port and a second port that can each be remotely opened and closed. The output of the feed switcher may be based on the combination of ports that are open. For instance, the first relay receives as inputs a first satellite feed and a second satellite feed. The second relay receives as inputs a third satellite feed and an output of the first relay. The output of the first relay includes the first satellite feed or the second satellite feed. The output of the second relay is based on whether at least one of the first port and the second port is open and could be either the output of the first relay or the third satellite feed.

Thus, the output of the feed switcher can be the first satellite feed, the second satellite feed, or the third satellite feed, depending on which ports of the microcontroller are open. Because the ports of the microcontroller can be controlled electronically, the feed switcher can be remotely controlled to provide different satellite feeds to a receiver. This may allow for remote testing of the receiver vis-à-vis the different feeds without requiring a technician be present to manually change the input feed to the receiver.

The system shown in the FIGS. may take many different forms and include multiple and/or alternate components and facilities. The exemplary components illustrated are not intended to be limiting. Indeed, additional or alternative components and/or implementations may be used.

Figure 1:
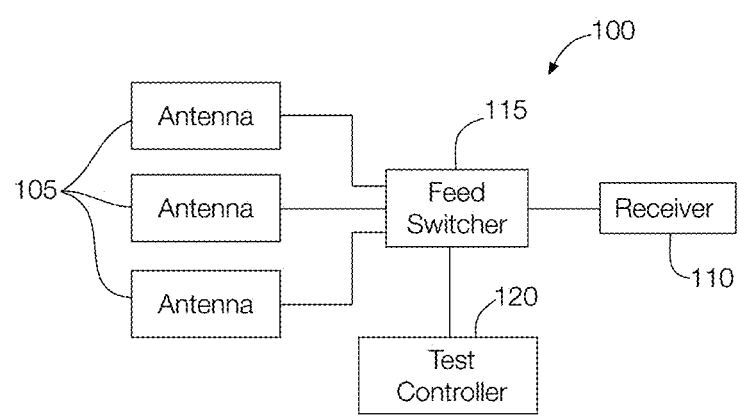
FIG. 1 illustrates an exemplary system for testing satellite feeds.

As illustrated in FIG. 1, the system 100 includes multiple antennas 105, a receiver 110, a feed switcher 115, and a test controller 120. The system 100 allows the receiver 110 to be tested remotely without requiring that a technician be present to, e.g., switch the feeds provided to the receiver 110.

The antenna 105 may be configured to receive signals transmitted from various satellites in orbit around the Earth. The satellites, while in orbit, may be configured to receive signals from a broadcast station (not shown) and broadcast signals back to Earth. The antenna 105 may receive the signals broadcast from the satellite. The satellites and antenna 105 may be configured to communicate in accordance with a satellite telecommunications protocol. The antenna 105 may be configured to receive signals from any number of satellites, and pass any received signals to the receiver 110 by way of the feed switcher 115. The system 100 as shown in FIG. 1 has multiple antennas 105, each configured to receive different signal feeds. One antenna 105 may be configured to receive a Western Arc feed while another may be configured to receive an Eastern Arc feed. The third antenna 105 may be configured to receive yet another type of satellite feed.

In some possible implementations, such as for purposes of testing a particular receiver 110, one or more of the antennas 105 may be virtually implemented. A virtual antenna 105 may be incorporated into a computer and configured to simulate a real antenna 105. Therefore, the virtual antenna 105, through its corresponding computing device, may be configured to generate and output test signals. The test signals may represent the signals that a real antenna 105 would output to a receiver 110 in response to a signal received from a satellite.

The receiver 110 may be configured to receive signals transmitted by at least one antenna 105. The received signals may have been broadcast from a satellite in orbit around the Earth, received by the antenna 105, and transmitted to the receiver 110. For testing purposes, as discussed above, the signals may have been generated by a virtual antenna 105 and transmitted to the receiver 110. The signals, whether real (e.g., transmitted from a satellite and received by an antenna 105) or simulated (e.g., transmitted from a virtual antenna 105), received by the receiver 110 may be associated with different feeds. Examples of different feeds may include a Western Arc feed, an Eastern Arc feed, and an uplink feed. The receiver 110 may be configured to process any received signals and output, e.g., media content, including audio, video, or both. Processing the received signals may include descrambling encrypted signals, converting digital signals to analog signals, transmitting signals to various servers, or the like.

The feed switcher 115 may be configured to simultaneously receive multiple signal feeds and output one of the received signal feeds to the receiver 110. The feed switcher 115 may receive multiple feeds from a single antenna 105 or single feeds from multiple antennas 105. As discussed above, the antennas 105 can be real or virtual. For instance, the feed switcher 115 may receive a Western Arc feed from one antenna 105 and an Eastern Arc feed from another antenna 105. Alternatively, the feed switcher 115 may receive simulated Western Arc feed, Eastern Arc feed, and uplink feed from a virtual antenna 105.

Because the receiver 110 may only process one feed at a time, the feed switcher 115 may be configured to only output one feed to the receiver 110 at a time. The output of the feed switcher 115 may be selectable by, e.g., a computing device such as the test controller 120 described in greater detail below. Alternatively or in addition, the feed may be manually selected by manipulating a switch on the feed switcher 115 or providing an input to a user interface device. The feed switcher 115 may be configured to transmit the selected feed to the receiver 110.

The test controller 120 may be configured to output a control signal to select the output of the feed switcher 115. The control signal may indicate which feed is to be passed from the feed switcher 115 to the receiver 110. The control signal may be generated automatically in response to a user input provided to the test controller 120 directly or through a user interface device.

Figure 2:
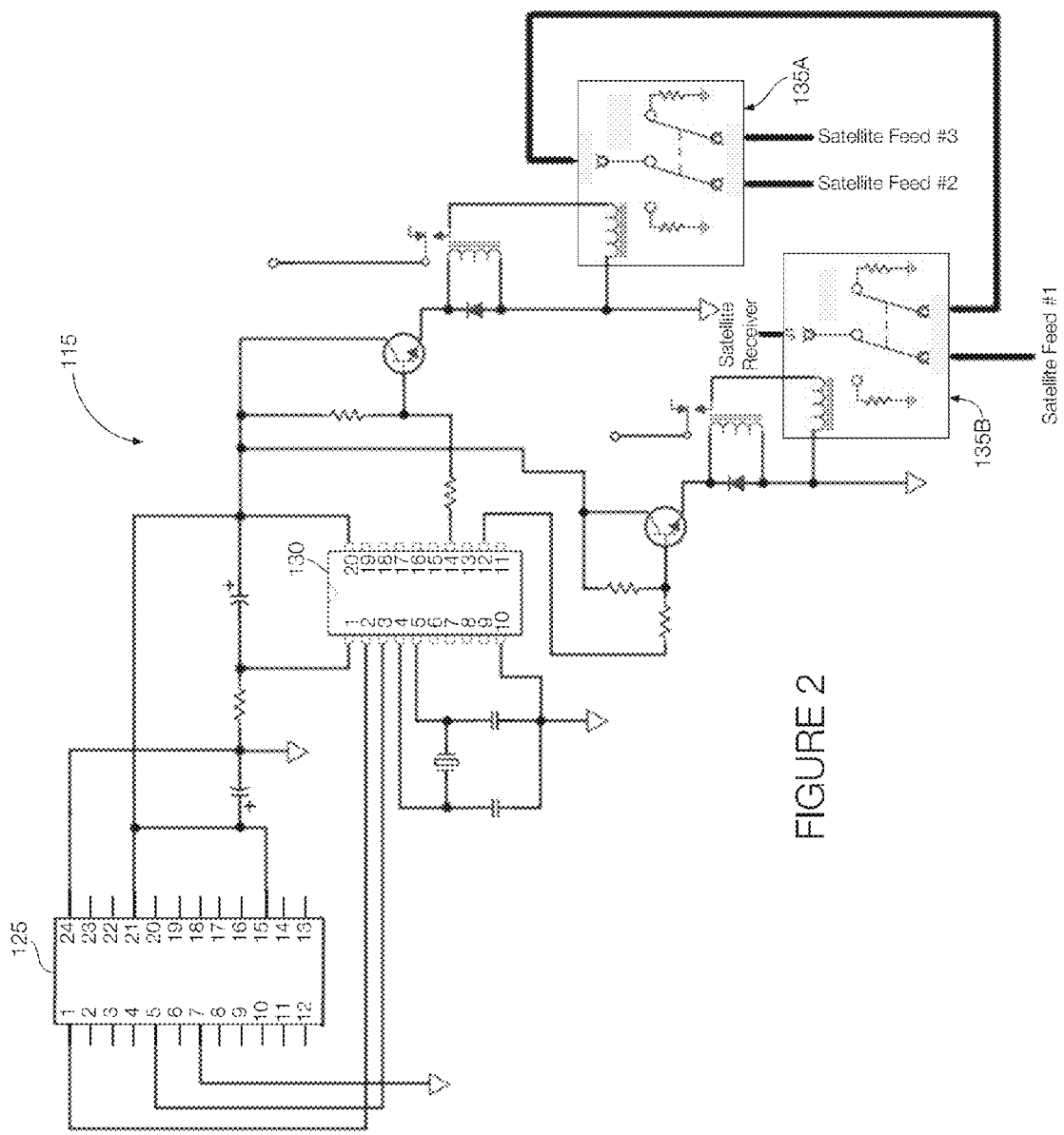
FIG. 2 is a schematic diagram of an example feed switcher that may be used in the system of FIG. 1.

FIG. 2 is a schematic diagram of an example feed switcher 115. As shown, the feed switcher 115 includes a converter module 125, a microcontroller 130, and relays 135, among other components.

The converter module 125 may be configured to receive signals in one format and output signals in another format. For instance, the converter module 125 may be configured to receive Universal Serial Bus (USB) input signals and output serial commands. The serial commands may indicate which ports of the microcontroller 130 should be opened, closed, or both. The converter module 125 may be configured to receive the USB input commands from a user interface device. Alternatively, the input commands may be output by a computing device automatically while executing a testing program. When testing a receiver 110, the converter module 125 may output a serial command to open one or more microcontroller ports. The combination of open and closed ports may allow only one feed to pass to the receiver 110 since the receiver 110, as discussed above, can only receive one feed at a time.

The microcontroller 130 may be configured to receive and process the serial commands output by the converter module 125. For instance, in response to receiving serial commands, the microcontroller 130 may be configured to open or close various ports. Voltage signals may only be output from open ports. Each port may be associated with a particular feed. When the port is open, the feed associated with that port may be passed to the receiver 110.

The feed switcher 115, as illustrated, includes two sequentially connected relays 135, each having two input connectors and an output connector. The input connectors of the relays 135 may be connected to one or more antennas 105, whether real or virtual, except that the output connector of one relay 135 is electrically connected to one of the input connectors of the other relay 135. Different numbers of relays 135 with different configurations are also possible.

In general, each relay 135 may include a switch configured to connect one of the inputs to the output based on which microcontroller ports are open. The switch may be electromagnetically controlled. Therefore, the signal from the microcontroller 130 when one port is open may cause the switch to selectively connect one input to the output. When another port is open, however, the switch may selectively connect the other input to the output.

One example configuration of relays 135 is shown in FIG. 2. As shown, a first relay 135A is configured to receive inputs associated with two satellite feeds, labeled "Satellite Feed #2" and "Satellite Feed #3." Whether the port labeled 14 in the example diagram of FIG. 2 is open may determine whether the switch connects "Satellite Feed #2" or "Satellite Feed #3" to the output of the first relay 135A.

The output of the first relay 135A is electrically connected to one of the inputs of the second relay 135B. The other input of the second relay 135B is connected to another satellite feed, labeled "Satellite Feed #1." As shown in the example schematic diagram of FIG. 2, whether "Satellite Feed #1" or the output of the first relay 135A is electrically connected to the output of the second relay 135B may be based on whether the microcontroller port labeled 12 is open. The output of the second relay 135B may be electrically connected to the receiver 110.

In the example schematic shown in FIG. 2, "Satellite Feed #1" may be output to the receiver 110 when the microcontroller port 12 is open and microcontroller port 14 is closed. "Satellite Feed #2" may be output to the receiver 110 when the microcontroller port 12 is closed and the microcontroller port 14 is open. "Satellite Feed #3" may be output to the receiver 110 when both microcontroller ports 12 and 14 are closed.

Because the feed switcher 115 can receive multiple signal feeds and output a selected signal feed to the receiver 110, and because the output of the feed switcher 115 may be controlled electronically, the feed switcher 115 may be used to remotely test a receiver 110 with respect to various signal feeds. With the feed switcher 115, a technician need not be present to manually adjust the signal feeds provided to the receiver 110 during testing.

In general, computing systems and/or devices discussed above may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus the following claims are hereby incorporated into the Detailed Description, with each claim standing on its own as a separately claimed subject matter.

The invention claimed is:

1. A feed switcher comprising:
a microcontroller having a plurality of ports, including a first port and a second port;
a first relay electrically connected to the microcontroller and configured to receive as inputs a first satellite feed and a second satellite feed; and
a second relay electrically connected to the microcontroller and configured to receive as inputs a third satellite feed and an output of the first relay, wherein the output of the first relay includes one of the first satellite feed and the second satellite feed,
wherein the second relay is configured to output one of the output of the first relay and the third satellite feed based on whether at least one of the first port and the second port is open.

2. The feed switcher of claim 1, wherein the first relay is configured to output one of the first satellite feed and the second satellite feed based on whether at least one of the first port and the second port is open.

3. The feed switcher of claim 1, wherein the first relay and the second relay each include an electromagnetically controlled switch.

4. The feed switcher of claim 1, further comprising a converter module configured to output a command signal to the microcontroller, wherein the command signal commands the microcontroller to open at least one of the first port and the second port.

5. The feed switcher of claim 1, wherein the second relay is configured to output one of the output of the first relay and the third satellite feed to a receiver.

6. The feed switcher of claim 1, wherein the first relay is configured to output the first satellite feed to the second relay when the first port of the microcontroller is open.

7. The feed switcher of claim 6, wherein the second relay is configured to output the first satellite feed to a receiver when the first port of the microcontroller is open and the second port of the microcontroller is closed.

8. The feed switcher of claim 1, wherein the first relay is configured to output the second satellite feed to the second relay when the first port of the microcontroller is closed and the second port of the microcontroller is open.

9. The feed switcher of claim 1, wherein the second relay is configured to output the third satellite feed when the first and second ports of the microcontroller are closed.

10. A system comprising:
a receiver;
a controller configured to output a control signal; and
a feed switcher configured to receive a plurality of signal feeds and selectively provide at least one of the plurality of signal feeds to the receiver, wherein the feed switcher is configured to select and output one of the plurality of signal feeds in accordance with the control signal,
wherein the feed switcher includes:
a microcontroller having a plurality of ports, including a first port and a second port,
a first relay electrically connected to the microcontroller and configured to receive as inputs a first signal feed and a second signal feed, and
a second relay electrically connected to the microcontroller and configured to receive as inputs a third signal feed and an output of the first relay, wherein the output of the first relay includes one of the first signal feed and the second signal feed.

11. The system of claim 10, wherein the second relay is configured to output one of the output of the first relay and the third signal feed based on whether at least one of the first port and the second port is open.

12. The system of claim 11, wherein the first relay is configured to output one of the first signal feed and the second signal feed based on whether at least one of the first port and the second port is open.

13. The system of claim 10, wherein the feed switcher includes a converter module configured to output a command signal to the microcontroller, wherein the command signal commands the microcontroller to open at least one of the first port and the second port.

14. The system of claim 10, further comprising an antenna configured to output at least one of the signal feeds, wherein the antenna is electrically connected to the feed switcher.

15. The system of claim 14, wherein the antenna is configured to receive the signal feed over a satellite communication network.

16. The system of claim 14, wherein the antenna includes a virtual antenna incorporated into a computing device.

17. The system of claim 14, wherein the antenna is configured to transmit the plurality of signal feeds to the feed switcher.

18. The system of claim 10, further comprising a plurality of antennas electrically connected to the feed switcher, wherein each antenna is configured to output one of the signal feeds.

* * * * *